US012548948B2

(12) United States Patent
Blankinship et al.

(10) Patent No.: US 12,548,948 B2
(45) Date of Patent: Feb. 10, 2026

(54) KEYED ELECTRIC CONNECTOR

(71) Applicant: J.S.T. Corporation, Farmington Hills, MI (US)

(72) Inventors: Eric Blankinship, Lathrup Village, MI (US); Ping Chen, Novi, MI (US); Gwendolyn Upson, Ypsilanti, MI (US)

(73) Assignee: J.S.T. Corporation, Farmington Hills, MI (US)

( * ) Notice: Subject to any disclaimer, the term of this patent is extended or adjusted under 35 U.S.C. 154(b) by 315 days.

(21) Appl. No.: 18/140,967

(22) Filed: Apr. 28, 2023

(65) Prior Publication Data

US 2024/0364054 A1 Oct. 31, 2024

(51) Int. Cl.
*H01R 13/645* (2006.01)
*H01R 13/502* (2006.01)
*H01R 13/629* (2006.01)

(52) U.S. Cl.
CPC ....... *H01R 13/6456* (2013.01); *H01R 13/502* (2013.01); *H01R 13/629* (2013.01)

(58) Field of Classification Search
CPC .. H01R 13/64; H01R 13/6456; H01R 13/502; H01R 13/629
USPC ................................. 439/660, 677, 680, 681
See application file for complete search history.

(56) References Cited

U.S. PATENT DOCUMENTS 3,112,974 A * 12/1963 Curtis .................... H01R 13/64 439/292
3,656,086 A * 4/1972 Debaigt ............... H01R 13/514 439/518
4,813,892 A * 3/1989 Strate ..................... H01R 13/64 439/680
5,044,994 A * 9/1991 Van Woensel ..... H01R 13/6456 439/681
5,370,556 A * 12/1994 Olsson ................. H01R 13/645 439/680
5,460,548 A * 10/1995 Roth ...................... H01R 13/64 439/680
5,816,842 A * 10/1998 Thantrakul .......... H01R 12/727 439/680
6,364,718 B1 * 4/2002 Polgar .................... H01R 13/64 439/680
7,044,806 B2 * 5/2006 Sian ..................... H01R 13/424 439/752
7,534,115 B2 5/2009 Murano et al.
9,711,901 B2 7/2017 Scholeno
2020/0287323 A1 * 9/2020 Lee ...................... H01R 13/642

FOREIGN PATENT DOCUMENTS

CN 107735910 A 2/2018

* cited by examiner

*Primary Examiner* — Gary F Paumen
(74) *Attorney, Agent, or Firm* — Sterne, Kessler, Goldstein & Fox P.L.L.C.

(57) ABSTRACT

A connector having a male housing and a female housing with keying systems is provided. The keying system on the male housing has a first keying pattern and a second keying pattern. The keying system on the female housing has a third keying pattern and a fourth keying pattern. The keying patterns can be ribs and grooves. A rib of the first keying pattern can be inserted to a groove of the third keying pattern to allow mating of the male housing and the female housing. A rib of the second keying pattern can be inserted to a groove of the fourth keying pattern to allow mating of the male housing and the female housing.

20 Claims, 10 Drawing Sheets

KEYED ELECTRIC CONNECTOR

FIELD

The present disclosure relates to connectors. In particular, aspects relate to electrical connectors having keying systems to ensure correct mating between a keyed female housing and a corresponding keyed male housing.

BACKGROUND

Electrical connectors can be used in various wiring systems. Electrical connectors can include a locking mechanism to maintain coupling between a female housing and a male housing. The female housing can support one or more terminals for mating with one or more male pins supported by the male housing. Electrical connectors can also include mechanisms, such as color coding, to single that a matching pair of female housing and male housing are correctly mated.

SUMMARY

Some aspects are directed to a connector having a male housing and a female housing. The male housing has a first keying pattern on a left side and a second keying pattern on a right side, and the first keying pattern and the second keying pattern each comprises a rib and a groove. The female housing has a third keying pattern on a left side and a fourth keying pattern on a right side, and the third keying pattern and the fourth keying pattern each comprises a rib and a groove. The rib of the first keying pattern is configured to be inserted to the groove of the third keying pattern, and the rib of the third keying pattern is configured to be inserted to the groove of the first keying pattern, thereby allowing the female housing to mate with the male housing. The rib of the second keying pattern is configured to be inserted to the groove of the fourth keying pattern, and the rib of the fourth keying pattern is configured to be inserted to the groove of the second keying pattern, thereby allowing the female housing to mate with the male housing.

In some aspects, the rib of the first pattern has a cross-sectional area in a rod shape, and the groove of the third pattern has a cross-sectional area in a rod shape.

In some aspects, the rib of the first pattern has a cross-sectional area in an inverted-T shape extending from the top side of the male housing, and the groove of the third pattern has a cross-sectional area in an inverted-T shape.

In some aspects, the groove of the first pattern has a cross-sectional area in a T shape, and the rib of the third pattern has a cross-sectional area in a T shape extending from the top side of the female housing.

In some aspects, the rib of the second pattern has a cross-sectional area in a rod shape, and the groove of the fourth pattern has a cross-sectional area in a rod shape.

In some aspects, the rib of the second pattern has a cross-sectional area in an inverted-T shape extending from the top side of the male housing, and the groove of the fourth pattern has a cross-sectional area in an inverted-T shape.

In some aspects, the groove of the second pattern has a cross-sectional area in a T shape, and the rib of the fourth pattern has a cross-sectional area in a T shape extending from the top side of the female housing.

In some aspects, the rib of the first pattern and the rib of the second pattern extend from a front side of the male housing to a point between the front side and a rear side of the male housing.

In some aspects, the rib of the third pattern and the rib of the fourth pattern extend from a rear side of the female housing to a point between the rear side and a front side of the female housing.

In some aspects, the rib of the male housing extends downwardly from a top side of the male housing.

In some aspects, the rib of the female housing extends upwardly from a top side of the female housing.

Some aspects are directed to a method of connecting a connector having the steps of selecting a first housing comprising a first keying pattern comprising a rib and a groove, selecting a second housing comprising a second keying pattern comprising a rib and a groove, and mating the male housing with the female housing with a first force. The second keying pattern corresponds to the first keying pattern. The rib of the first keying pattern is configured to be inserted to the groove of the second keying pattern, and the rib of the second keying pattern is configured to be inserted to the groove of the first keying pattern.

In some aspects, if a third housing comprising a third keying pattern comprising a rib and a groove different from the second keying pattern is used to mate the third housing with the first housing with a second force, the second force is at least three times larger than the first force.

In some aspects, the rib of the first keying pattern and the rib of the third keying pattern are deformed if the first housing and the third housing are mated.

Some aspects are directed to a connector having a first housing and a second housing. The first housing has a first keying system selected from a rod shape formed by a rib, an inverted-T shape formed by a rib, or a T shape formed by a groove. The second housing has a second keying system selected from a rod shape formed by a groove, an inverted-T shape formed by a groove, or a T shape formed by a rib. The second keying system is configured to mate with the first keying system such that the second keying system is selected to correspond to the first keying system.

In some aspects, the first keying system is disposed on a left side of the first housing, and the second keying system is disposed on a left side of the second housing.

In some aspects, the first keying system is disposed on a right side of the first housing, and the second keying system is disposed on a right side of the second housing.

In some aspects, the first keying system extends from a top of the first housing, and the second keying system extends from a top of the second housing.

In some aspects, the first keying system is disposed on a front of the first housing, and the second keying system is disposed on a rear of the second housing.

In some aspects, the first keying system is disposed along a longitudinal direction of the first housing, and the second keying system is disposed along a longitudinal direction of the second housing.

BRIEF DESCRIPTION OF THE DRAWINGS/FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
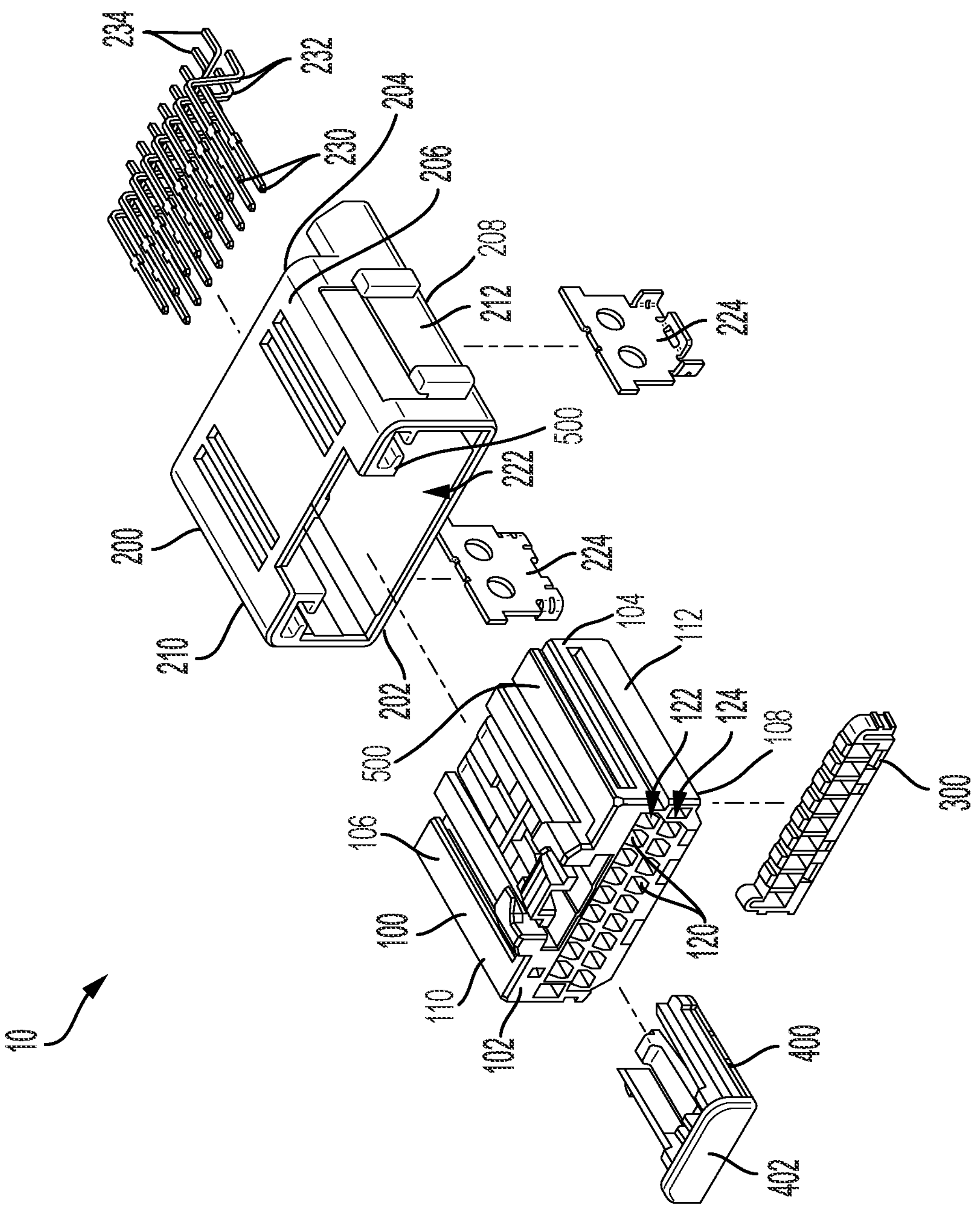
FIG. 1 is an assembly view of a connector according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As used herein, the term "approximately" is inclusive of the number to which it refers and includes numbers that bound and are within a range of 5%, 10%, 15%, or 20% except where such number would exceed 100% of a possible value.

Aspects provide an electrical connector for wiring systems, such as a vehicle wiring system. The electrical connector described herein can be a single or dual row, low profile, high voltage connector. In some aspects, the connector can have a low profile. The connector can secure to a printed circuit board (PCB), or can be a wire to wire connector, for example.

The electrical connector can include a female housing, a male housing, a connector position assurance member ("CPA member"), and a terminal position assurance member ("TPA member"). The female housing, the CPA member, and the TPA member can form an assembly that can be coupled to the male housing. In some embodiments, each of the female housing and the male housing includes a keying system to ensure correct mating between the female housing and the corresponding male housing.

The CPA member can ensure position assurance. Position assurance is important in wiring systems to ensure and maintain terminal mating and resist disconnection. To ensure coupling, a higher force can be required to couple the assembly with the male housing. The coupling can be intentionally released for maintenance by overcoming the resistance to disconnection. The CPA member can be released to allow decoupling of the female housing and male housing. Advantageously, feedback (e.g., a visual, tactile, and/or auditory feedback) can be provided to signal that the connector housings are coupled with position assurance. The coupling with connector position assurance between the assembly and the male housing can move the electrical connector from a pre-mate position to a fully mated position. The assembly including the female housing and the CPA member can be pre-installed. Accordingly, a user does not have to couple the CPA member to the female housing. In addition, the pre-installed assembly can help to prevent components from being detached and/or misplaced.

The TPA member can maintain proper terminal positioning within the housings. Terminal segments containing wire terminals can include a primary lock to maintain their position in a housing, ensuring proper mating. In an aspect, a portion of the TPA member can extend outside the female housing. In an aspect, the TPA member can reinforce the primary lock. In another aspect, a TPA member can be a secondary lock. Advantageously, feedback (e.g., visual, tactile, and/or audible feedback) can be provided to signal that the TPA member is in a final lock position so that a terminal can be installed with terminal position assurance. In the final lock position, the TPA member can be fully within the female housing. Once the terminal segments are installed, the TPA member can be in a final lock position in which the TPA member can be in blocking engagement with the terminal segments to prevent the terminal segments from being unintentionally removed from the female housing. The TPA member can also be pre-installed in the assembly of female housing and the CPA member. Accordingly, a user does not have to couple the TPA member to the female housing.

The male housing can include a front, a rear, a top, a bottom, a first side, and a second side. An aperture for receiving the female housing and TPA member assembly can extend from the front to a portion between the front and the rear. The female housing can include a front, a rear, a bottom, a top, a first side, and a second side. A keying system can be disposed, for example, on the top of the male housing and the top of the female housing. The keying system can have keying ribs forming different patterns, and the patterns on the male housing can correspond to patterns on the corresponding female housing, so that the matching pair of male housing and female housing can be correctly mated together. If a wrong pair of male housing and female housing are mismated, it can require at least three times of insertion force greater than mating a correct pair of male housing and female housing, thus signaling to the user that it is an incorrect match and potentially reduce damage or mismating in the first place.

The keying systems described herein generally relate to three patterns: rod shape, T shape, and inverted-T shape. The keying system can have one complimentary/corresponding pattern on the first side of the male housing and the female housing, and another complimentary/corresponding pattern one the second side of the male housing and the female housing. The patterns on the first side and the on the second side can be the same or different. Accordingly, within the limited space on the top of the male housing and the female housing, the combination of the patterns on the first side and the second side can provide nine different keying options, accommodating situations where up to nine different connectors are used. Thus, the keying systems described herein provides a more efficient alternative to color coding a matching pair of male housing and female housing. For example, nine different colors would have been required to signal nine matching pair of male housing and female housing, but with the keying systems, all housings can be manufactured with one color. Additionally, the keying systems can be combined with color coding to greatly expand the number of connectors that can be accommodated in a single situation. For example, using two different color codings with the keying systems accommodates 18 connectors, etc.

One or more terminal apertures can extend intermediate to a first side and a second side opposing the first side of the female housing. The terminal apertures can extend from the front to the rear of the female housing to receive one or more terminal segments. Another aperture can extend from the bottom to a portion between the bottom and the top of the female housing to receive the TPA member.

The terminal apertures can be arranged in one or more rows. In some aspects, the terminal apertures can be arranged in two rows. As described herein, a first row and a second row of terminal apertures can be provided, the second row being below the first row. In some aspects, the rows of terminal apertures can be aligned such that terminal apertures are arranged in parallel. In some aspects, the rows of terminal apertures can be offset.

The rear of the male housing can include a plurality of openings through which a plurality of pins are disposed. Accordingly, the pins extend into the aperture that receives the female housing. The pins can correspond to the terminal apertures in the female housing. In this way, when the female housing and male housing are coupled, the pins of the male housing can be aligned with the terminal apertures of the female housing. Terminals supported by the terminal aperture can therefore mate with the pins as the female housing and the male housing are mated.

In some aspects, the connector can be a single or dual row, low profile, connector. Accordingly, the arrangement of the male pins can support forming a single or dual row of solder pads. In some aspects, the connector can be a high voltage connector that supports 18 or 21 pins, for example. In some aspects, the overall size of the electrical connector can be reduced such that the connector has a low profile. For example, generally parallel rows of terminals can allow for a reduced female housing size to limit the connector profile. In addition, orienting the terminals such that they are generally parallel to the top end and the bottom end of the female housing can support the electrical connector having a low profile. The arrangement of the terminals can also support a larger clearance or creepage. For example, a clearance or creepage for an electrical path extending from a first terminal of the plurality of terminals to a second terminal of the plurality of terminals can be approximately 0.6 millimeters.

A connector 10 is shown in FIG. 1. Connector 10 can include a female housing 100, a male housing 200, a TPA member 300, a CPA member 400, and keying systems 500 on female housing 100 and male housing 200. Female housing 100, TPA member 300, and CPA member 400 can form a pre-installed assembly. In the pre-installed assembly, TPA member 300 can be partially disposed in female housing 100 such that TPA member 300 can be in a pre-lock position. Female housing 100 can include a front 102, a rear 104, a top 106, a bottom 108, a first side 110, and a second side 112 opposite first side 110. In some aspects, first side 110 is the left side of female housing 100 when viewed from front 102, and second side 112 is the right side of female housing 100 when viewed from front 102. Male housing 200 can include a front 202, a rear 204, a top 206, a bottom 208, a first side 210, and a second side 212 opposite first side 210. In some aspects, first side 210 is the left side of male housing 200 when viewed from front 202, and second side 212 is the right side of male housing 200 when viewed from front 202. Male housing 200 can include an aperture 222 on front 202 to receive rear 104 of female housing 100 and the pre-installed assembly. Aperture 222 can extend through front 202 to a portion of male housing 200 between front 202 and rear 204. Top 206, bottom 208, first 210, and second 212 can enclose aperture 222 along with rear side 204.

Figure 2:
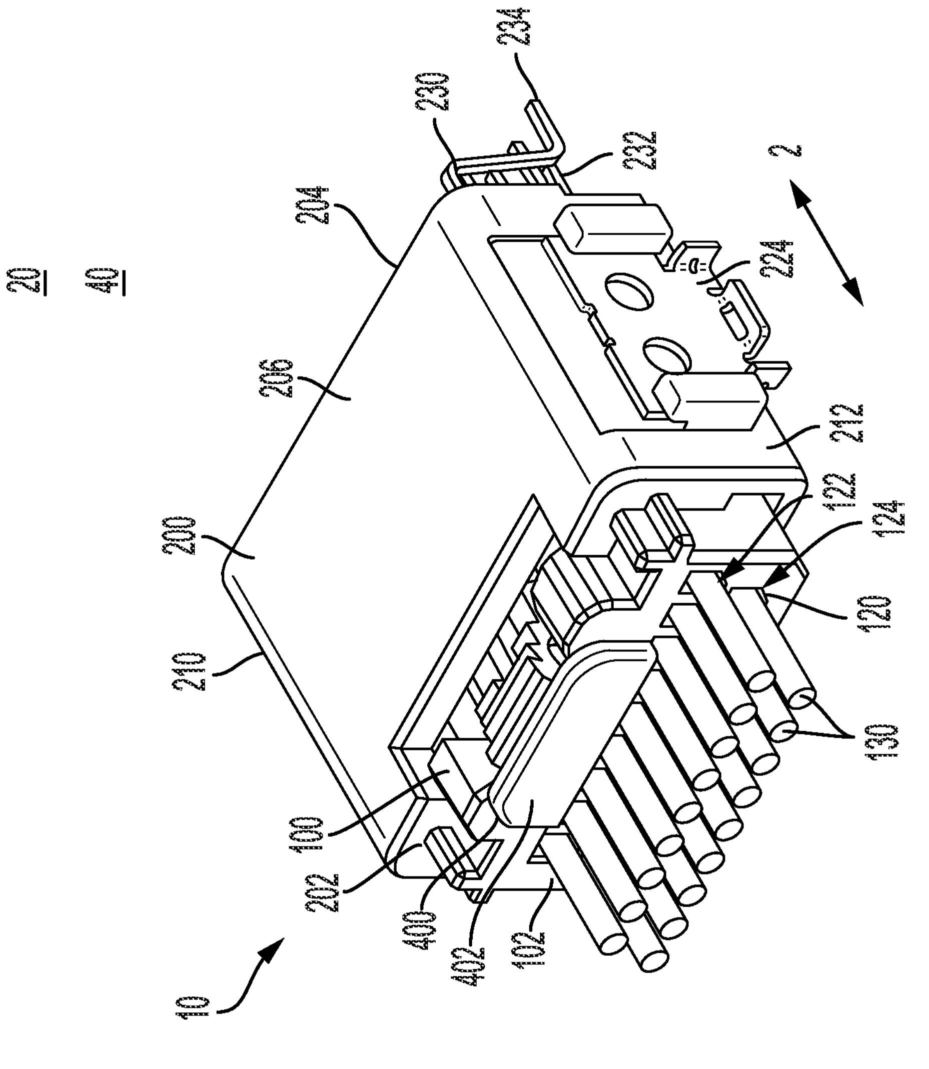
FIG. 2 is a perspective view of a connector according to various aspects.

With reference to FIGS. 1-2, aperture 222 can receive female housing 100 to mate one or more terminals 130 disposed in female housing 100 and one or more pins 230 disposed in male housing 200. Coupling CPA member 400 such that a front wall 402 of CPA member and a front 102 of female housing are aligned once female housing 100 is received by male housing 200 can provide position assurance. Coupling CPA member 400 in this way can move connector 10 from a pre-mate position to a fully mated position 40 (e.g., the female housing and the male housing are coupled to have a high resistance to decoupling). In an aspect, male housing 200 can receive the pre-installed assembly when TPA member 300 is in a final lock position 20 to couple male housing 200 to female housing 100. TPA member 300 can be entirely disposed within female housing 100 to move TPA member 300 from the pre-lock position to final lock position 20 after terminals 130 are inserted into female housing 100.

As shown in FIG. 1, in some aspects, keying systems 500 are disposed on top 106 of female housing 100 and top 206 of male housing 200. In some aspects, keying systems 500 can include keying ribs 502 forming keying patterns 504 on first side 110 and second side 112 of female housing 100 and first side 210 and second side 212 of male housing 200. In some aspects, keying systems 500 can from keying patterns 504 only on first side 110 of female housing 100 and only on first side 210 of male housing 200. In some aspects, keying systems 500 can from keying patterns 504 only on second side 112 of female housing 100 and only on second side 212 of male housing 200. In some aspects, keying ribs 502 on female housing 100 extend upwardly to form keying patterns 504, such that keying ribs 502 are on the outside female housing 100. In some aspects, keying ribs 502 on male housing 200 extend downwardly to form keying patterns 504, such that keying ribs 502 are inside aperture 222 of male housing 200. In some aspects, keying ribs 502 on female housing 100 extend in a longitudinal direction from rear 104 to a portion of female housing 100 between rear 104 and front 102. In some aspects, keying ribs 502 on male housing 200 extend a longitudinal direction from front 202 to a portion of male housing 200 between front 202 and rear 204.

In some aspects, keying ribs 502 forms keying patterns 504 with a rib shape 506 of ribs 502 and a groove shape 508 of the space around ribs 502. In some aspects, keying patterns 504 on female housing 100 correspond to and are compatible with keying patterns 504 on male housing 200 such that the connectors mate. For example, when keying patterns 504 are matching, rib shape 506 on female housing 100 corresponds with groove shape 508 on male housing 200, so that keying ribs 502 of female housing 100 can be inserted to groove shape 508 on male housing 200. Similarly, when keying patterns 504 are matching, groove shape 508 on female housing 100 corresponds with rib shape 506 on male housing 200, so that keying ribs 502 of male housing 200 can be inserted to groove shape 508 on female housing 100.

In some aspects, matching keying patterns 504 on female housing 100 and male housing 200 allow rear 102 of female housing 100 to mate with male housing 200 through aperture 222. In some aspects, if keying patterns 504 of female housing 100 do not match with keying patterns 504 of male housing 200, the insertion force required to insert rear 102 of female housing 100 to aperture 222 of male housing 200 can be at least three times greater. In some aspects, if keying patterns 504 of female housing 100 do not match with keying patterns 504 of male housing 200, the insertion force required to insert rear 102 of female housing 100 to aperture 222 of male housing 200 can be at least 1.5 times greater. In some aspects, if keying patterns 504 of female housing 100 do not match with keying patterns 504 of male housing 200, the insertion force required to insert rear 102 of female housing 100 to aperture 222 of male housing 200 can be at least two times greater. The increased insertion force can signal to a user that a wrong pair of female housing 100 and male housing 200 are mated. In some aspects, if keying patterns 504 of female housing 100 do not match with keying patterns 504 of male housing 200, female housing 100 and male housing 200 cannot be mated until keying ribs 502 deform or break.

Connector 10 in fully mated position 40 is shown in FIG. 2. In some aspects, keying patterns 504 of female housing 100 and male housing 200 must be matching in order for fully mated position 40 to happen. As shown, female housing 100 can include one or more terminal apertures 120 at front 102 to receive terminals 130. Terminal apertures 120 can extend from front 102 of female housing 100 along an axis generally parallel to a transverse axis 2 to a portion of female housing 100 between front 102 and rear 104.

In some aspects, terminal apertures 120 can be disposed between first side 110 and second side 112 of female housing 100 along front 102. In some aspects, female housing 100 can include a plurality of terminal apertures 120. The plurality of terminal apertures 120 can be arranged in one or more rows. As shown in FIG. 2, female housing 100 can include a first row 122 of terminal apertures 120 and a second row 124 of terminal apertures 120 positioned below first row 122 to receive terminals 130.

Figure 3:
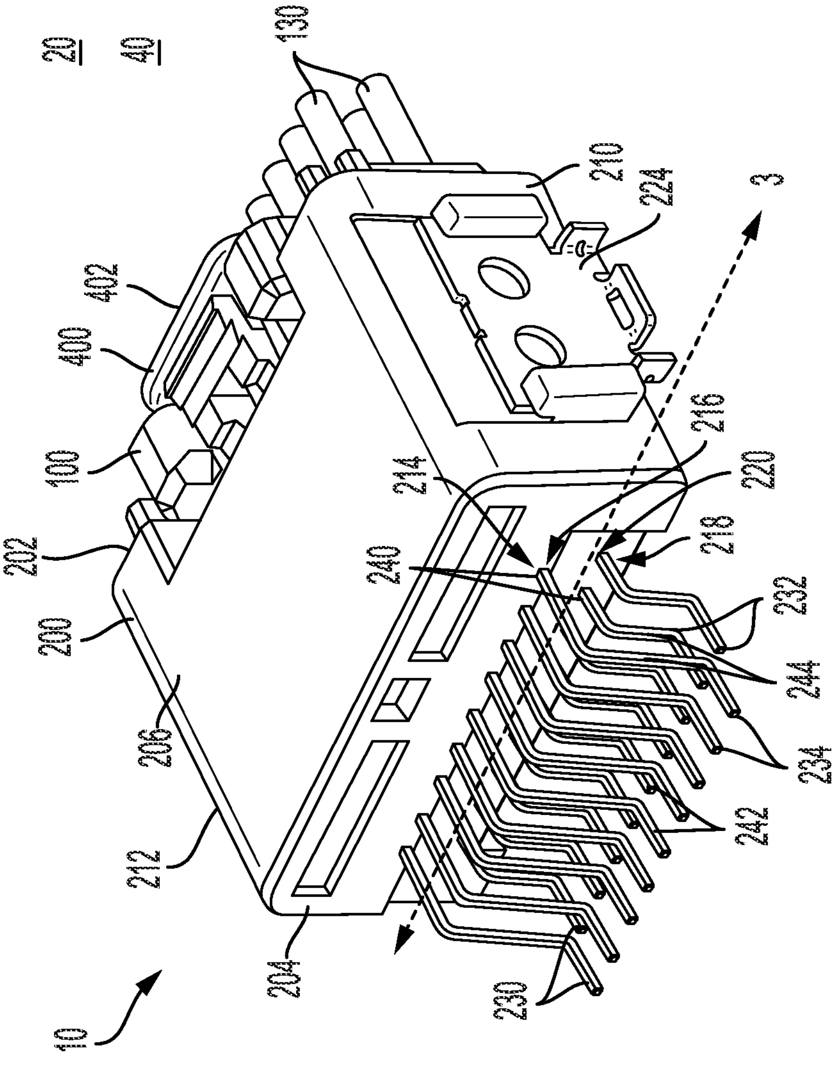
FIG. 3 is a perspective view of the connector of FIG. 2.

Aperture 222 of male housing 200 can receive the pre-installed assembly of female housing 100, TPA member 300 (FIG. 1), and CPA member 400 such that terminals 130 extend through male housing 200. As shown, male housing 200 can include one or more pins 230 and reinforcement tabs 224. Reinforcement tabs 224 can attach the male housing to a PCB, for example. With reference to FIG. 3, male housing 200 can include approximately 18 pins 230, in an aspect. In another aspect, male housing 200 can include 21 pins 230.

As shown in FIG. 3, rear 204 of male housing 200 can include one or more first openings 214 and one or more second openings 218. First openings 214 can be arranged in a first row 216 and second openings 218 can be arranged in a second row 220.

In some aspects, second openings 218 can be positioned below first openings 214. Accordingly, second row 220 of second openings 218 can be positioned below first row 216 of first openings 214. In some aspects, first openings 214 can be positioned above a central lateral axis 3 of rear 204 of male housing 200. Accordingly, first row 216 of first openings 214 can be positioned above central lateral axis 3. In some aspects, second openings 218 can be positioned below central lateral axis 3. Accordingly, second row 220 of second openings 218 can be positioned below central lateral axis 3.

In some aspects, second row 220 of second openings 218 can be aligned with first row 216 of first openings 214. In some aspects, second row 220 of second openings 218 can be offset from first row 216 of first openings 214. First row 216 of first openings 214 and second row 220 of second openings 218 can be formed in rear 204.

In some aspects, first row 216 of first openings 214 and second row 220 of second openings 218 can receive pins 230. Pins 230 can include one or more first pins 232 and one or more second pins 234. First pins 232 can be disposed in first openings 214 and second pins 234 can be disposed in second openings 218. Accordingly, first pins 232 can be arranged in a first row 236 that can coincide with first row 216 of first openings 214. Similarly, second pins 234 can be arranged in a second row 238 that can coincide with second row 220 of second openings 218. Pins 230 can be disposed in male housing 200 to mate with terminals 130.

Figure 4A:
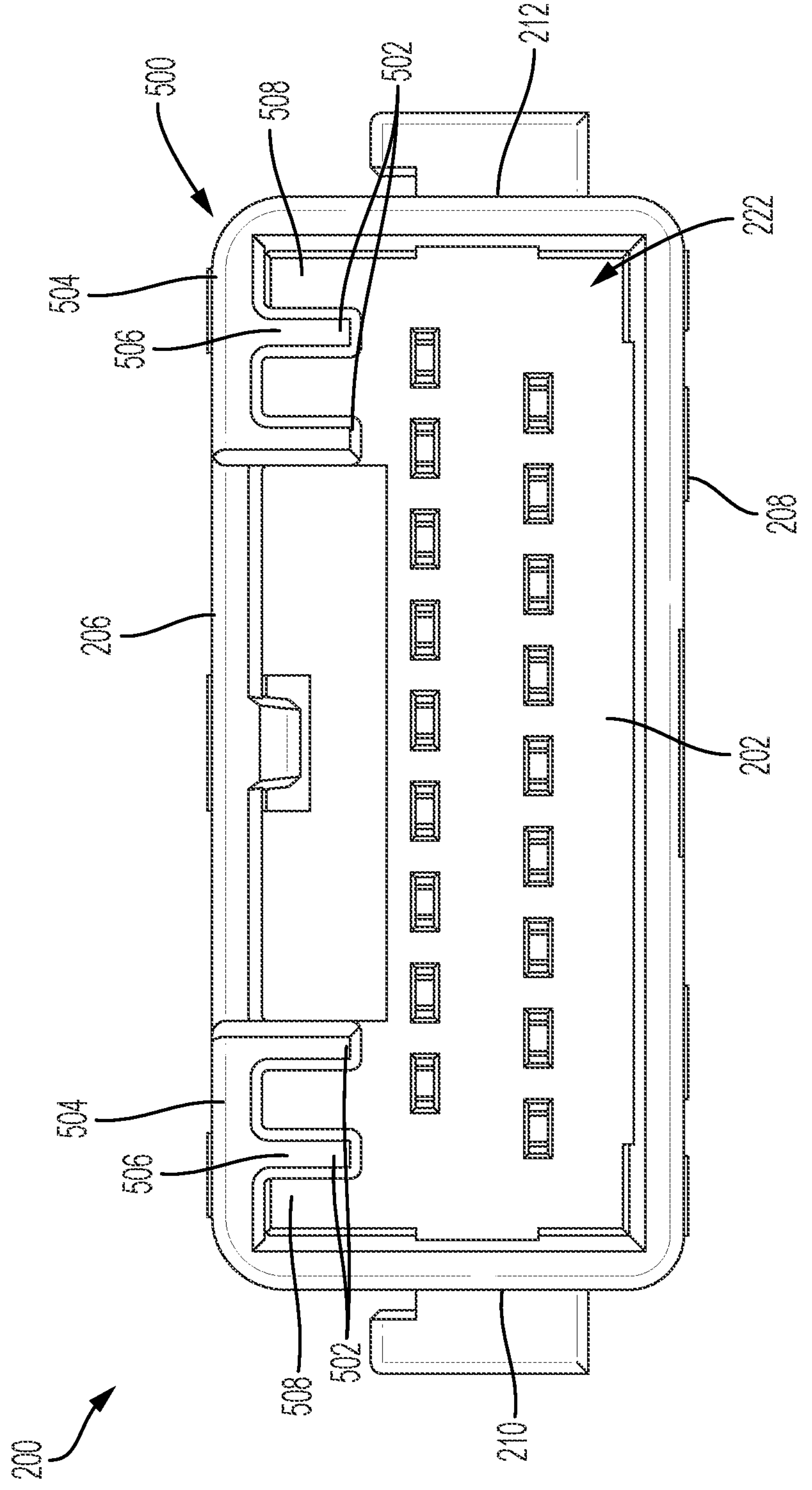
FIGS. 4A and 4B are side views of a male housing and a female housing, respectively, having a keying system according to various aspects.
Figure 4B:
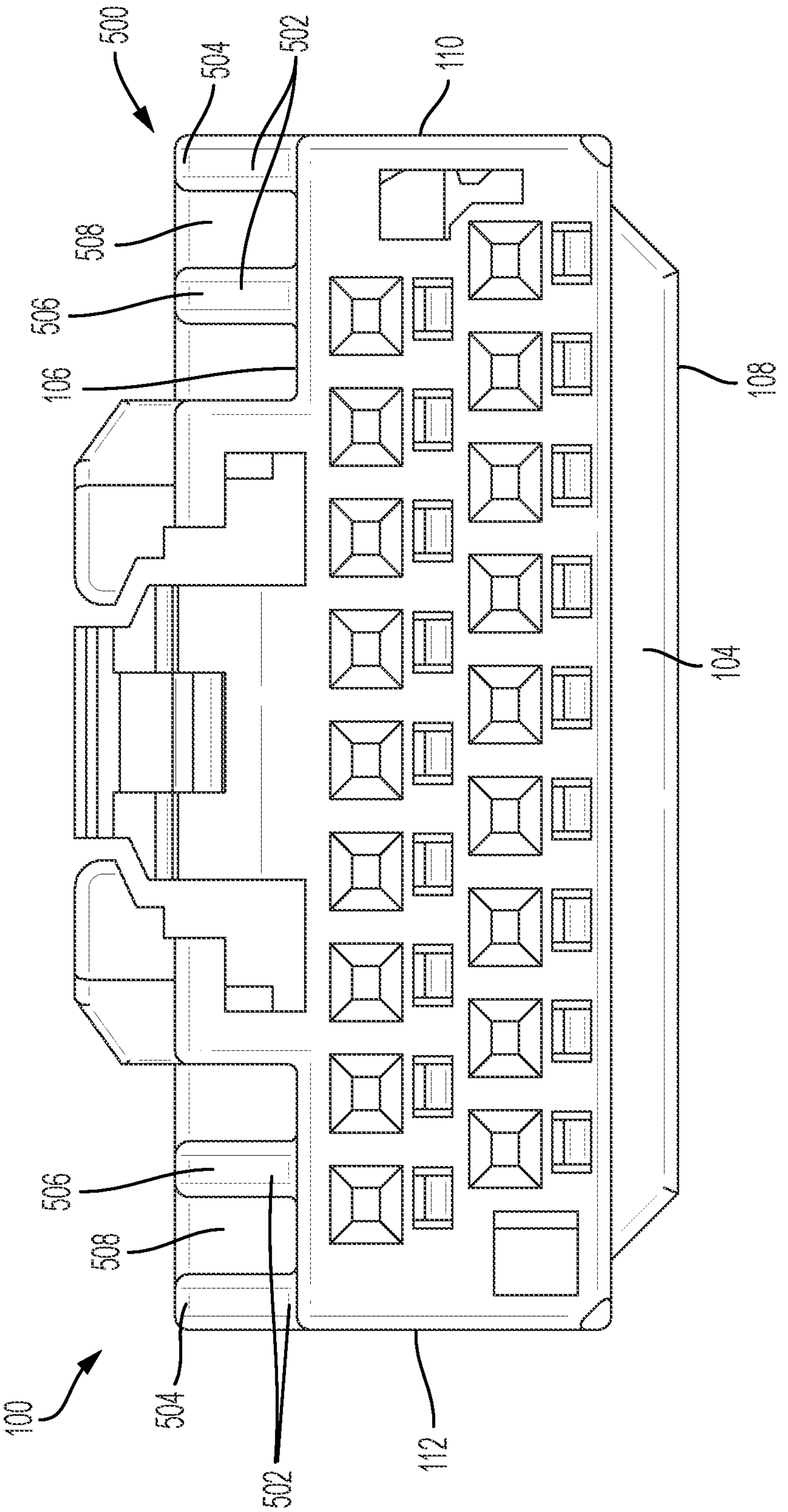

Keying systems 500 with various keying patterns 504 are shown in FIGS. 4-6. With reference to FIGS. 4A-4B, keying patterns 504 of female housing 100 and male housing 200 form a rod pattern. A view of front 202 of male housing 200 according to an aspect with a rod pattern is shown in FIG. 4A. In some aspects, keying ribs 502 extend downwardly from top 206 to form the keying patterns 504, such that keying ribs 502 are within aperture 222. Rib shape 506 is the cross-sectional shape of keying ribs 502, and for the rod pattern of male housing 200, rib shape 506 is an elongate rod perpendicular to top 206 and parallel to other keying ribs 502 if included. Groove shape 508 is the cross-sectional shape formed around keying ribs 502, and for the rod pattern of male housing 200, groove shape 508 is also an elongate rod perpendicular to top 206 and parallel to each other. In some aspects, the rod pattern can be formed on first side 210 and second side 212, as seen in the aspect of FIG. 4A. Alternatively, in some aspects, the rod pattern can be formed only on one of first side 210 and second side 212 and different from the other side.

Rear 104 of female housing 100 according an aspect with rod pattern is shown in FIG. 4B. In some aspects, keying ribs 502 extend upwardly from top 106 to form the keying patterns 504. For the rod pattern of female housing 100, rib shape 506 is an elongate rod perpendicular to top 206 and parallel to each other, and groove shape 508 is also an elongate rod parallel to each other. And because rib shape 506 of male housing 200 can be inserted into groove shape 508 of female housing 100, and rib shape 506 of female housing 100 can be inserted into groove shape 508 of male housing 200, keying patterns 504 are matching, and male housing 200 of FIG. 4A and female housing 100 of FIG. 4B can therefore be fully mated. In some aspects, the rod pattern can be formed on first side 110 and second side 112, as seen in the aspect of FIG. 4B. Alternatively, in some aspects, the rod pattern can be formed only on one of first side 110 and second side 112 and different from the other side.

Figure 5A:
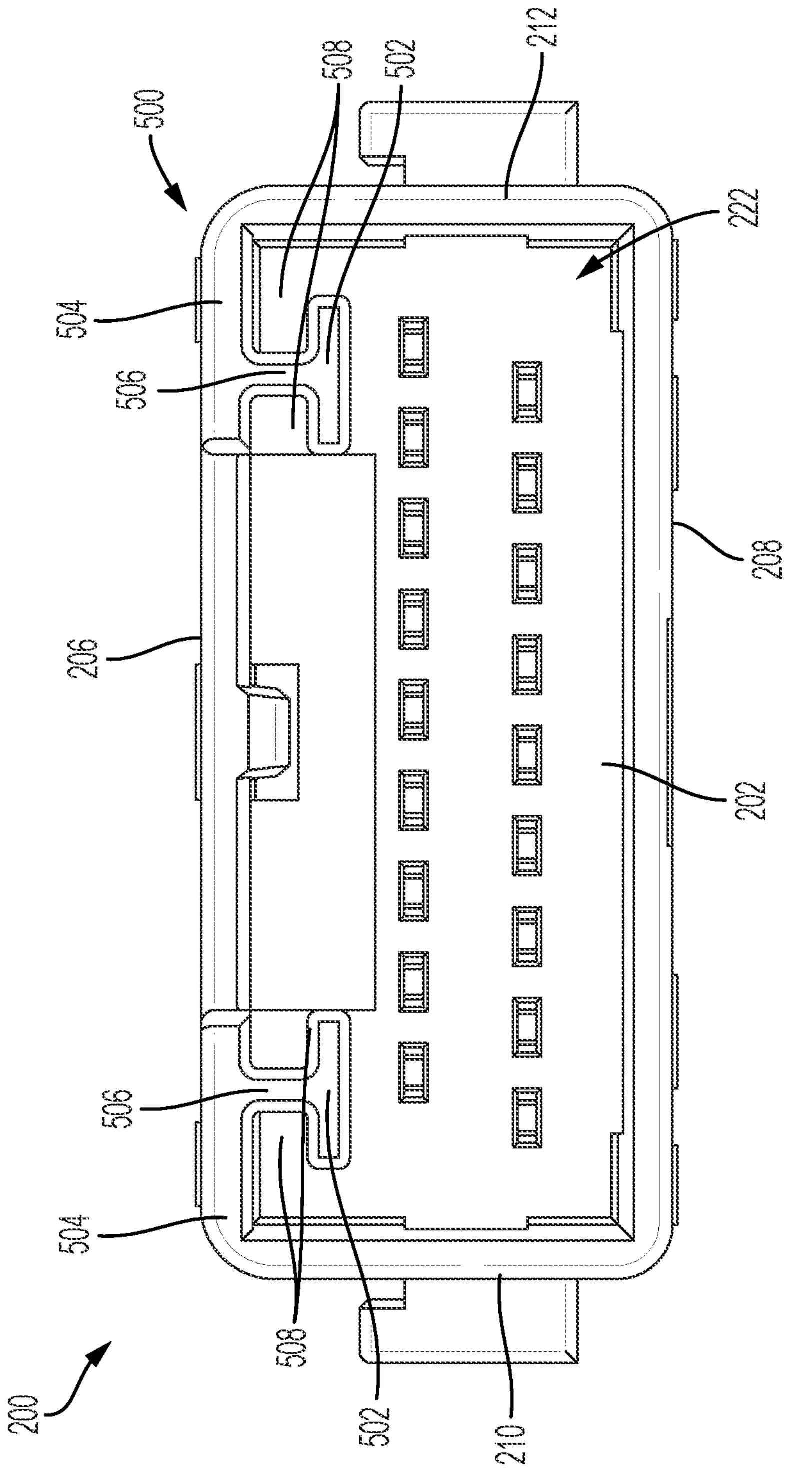
FIGS. 5A and 5B are side views of a male housing and a female housing, respectively, having a keying system according to various aspects.
Figure 5B:
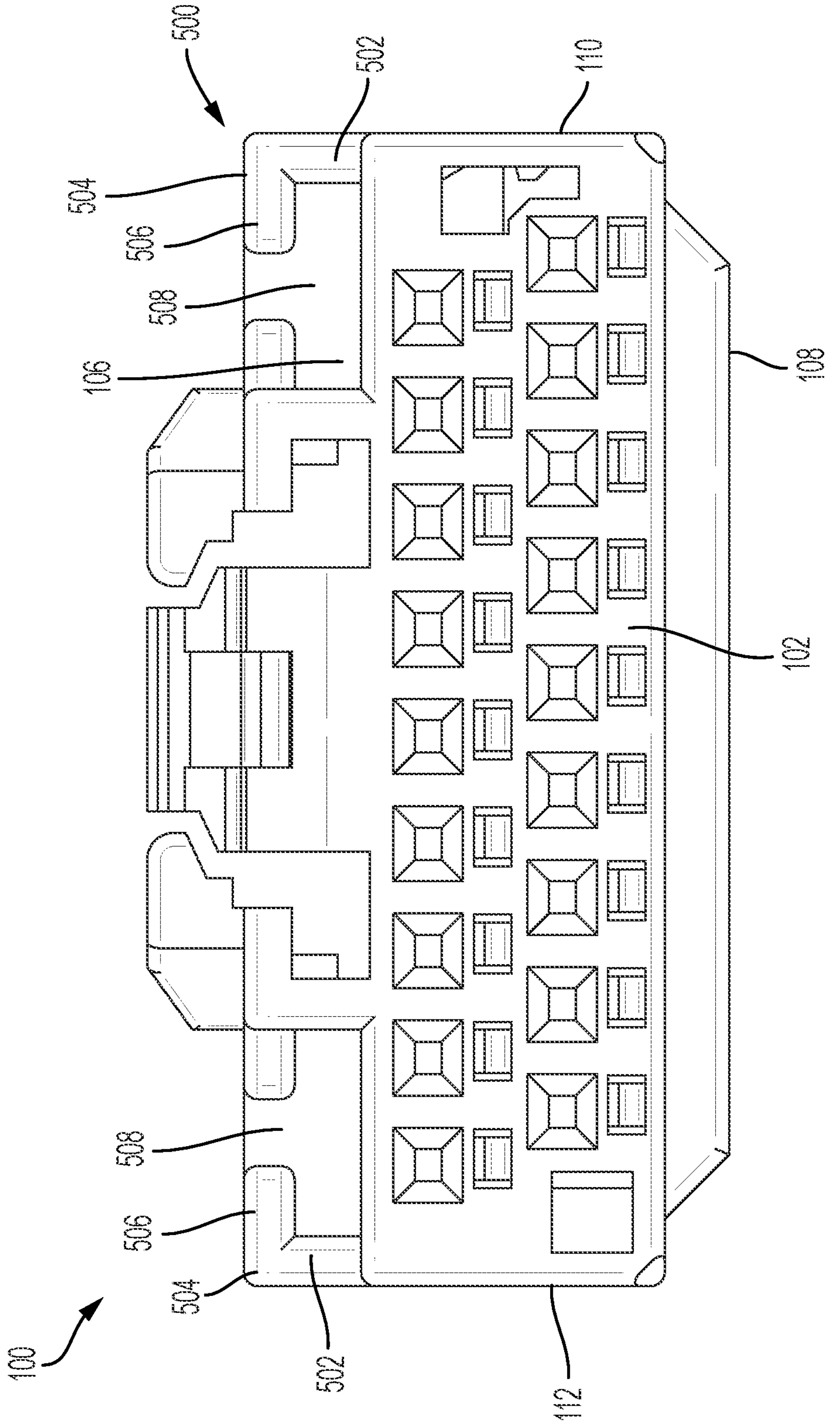

With reference to FIGS. 5A-5B, keying patterns 504 of female housing 100 and male housing 200 form an inverted-T pattern. A view of front 202 of male housing 200 according to an aspect with inverted-T pattern is shown in FIG. 5A. In some aspects, keying ribs 502 extend downwardly from top 206 to form the keying patterns 504, such that keying ribs 502 are within aperture 222. For the inverted-T pattern of male housing 200, rib shape 506 includes an elongate member extending perpendicular to top 206 and an elongate member parallel to top 206, such that it forms an inverted-T. Groove shape 508 is the space formed around rib shape 506. In some aspects, the inverted-T pattern can be formed on first side 210 and second side 212, as seen in the aspect of FIG. 5A. Alternatively, in some aspects, the inverted-T pattern can be formed only on one of first side 210 and second side 212 and different from the other side.

Rear 104 of female housing 100 according an aspect with inverted-T pattern is shown in FIG. 5B. In some aspects, keying ribs 502 extend upwardly from top 106 to form the keying patterns 504. For the inverted-T pattern of female housing 100, groove shape 508 has an invert-T shape, and rib shape 506 extends around groove shape 508 to form the invert-T shape. And because rib shape 506 of male housing 200 can be inserted into groove shape 508 of female housing 100, and rib shape 506 of female housing 100 can be inserted into groove shape 508 of male housing 200, keying patterns 504 are matching, and male housing 200 of FIG. 5A and female housing 100 of FIG. 5B can therefore be fully mated. In some aspects, the inverted-T pattern can be formed on first side 110 and second side 112, as seen in the aspect of FIG. 5B. Alternatively, in some aspects, the inverted-T pattern can be formed only on one of first side 110 and second side 112 and different from the other side.

Figure 6A:
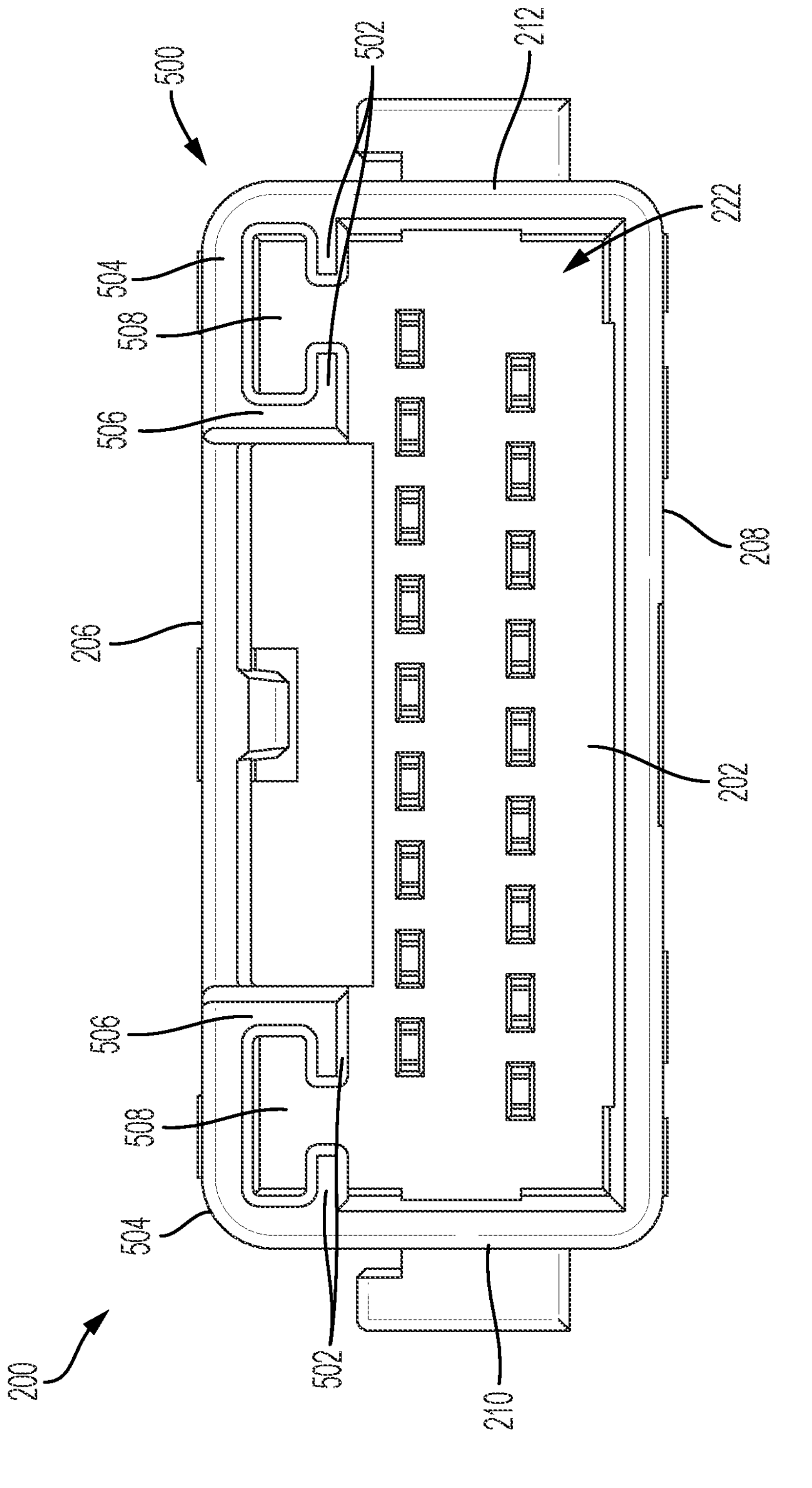
FIGS. 6A and 6B are side views of a male housing and a female housing, respectively, having a keying system according to various aspects.
Figure 6B:
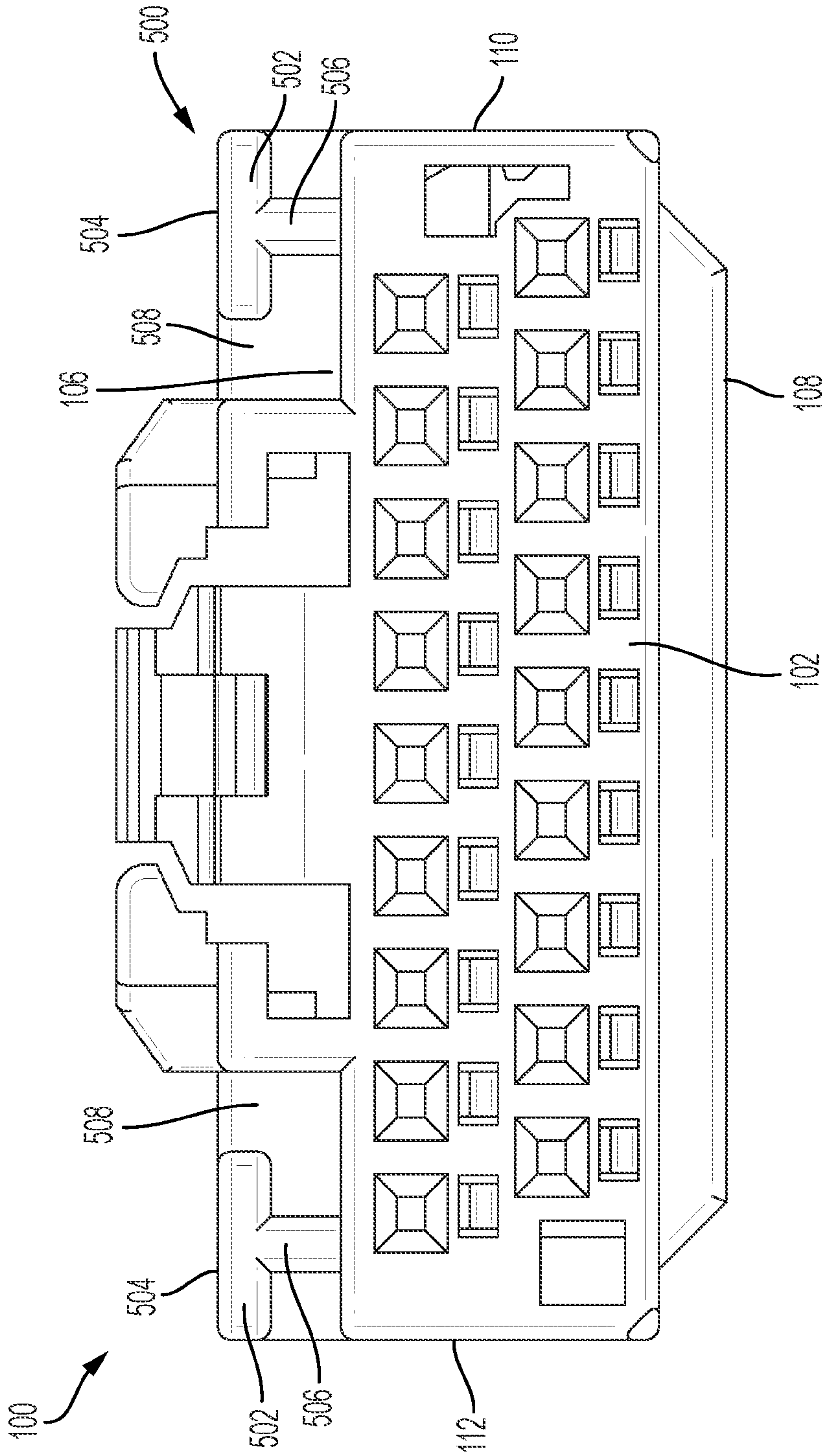

With reference to FIGS. 6A-6B, keying patterns 504 of female housing 100 and male housing 200 form a T pattern. A view of front 202 of male housing 200 according to an aspect with T pattern is shown in FIG. 6A. In some aspects, keying ribs 502 extend downwardly from top 206 to form the keying patterns 504, such that keying ribs 502 are within aperture 222. For the T pattern of male housing 200, groove shape 508 has a T shape, and rib shape 506 extends around groove shape 508 to form the T shape. In some aspects, the T pattern can be formed on first side 210 and second side 212, as seen in the aspect of FIG. 6A. Alternatively, in some aspects, the T pattern can be formed only on one of first side 210 and second side 212 and different from the other side.

Rear 104 of female housing 100 according an aspect with T pattern is shown in FIG. 6B. In some aspects, keying ribs 502 extend upwardly from top 106 to form keying patterns 504. For the T pattern of female housing 100, rib shape 506 includes an elongate member extending perpendicular to top 206 and an elongate member parallel to top 206, such that it forms a T shape, and groove shape 508 is the space formed next to rib shape 506. Because rib shape 506 of male housing 200 can be inserted into groove shape 508 of female housing 100, and rib shape 506 of female housing 100 can be inserted into groove shape 508 of male housing 200, keying patterns 504 are matching, and male housing 200 of FIG. 6A and female housing 100 of FIG. 6B can therefore be fully mated. In some aspects, the T pattern can be formed on first side 110 and second side 112, as seen in the aspect of FIG. 6B. Alternatively, in some aspects, the T pattern can be formed only on one of first side 110 and second side 112 and different from the other side.

Figure 7:
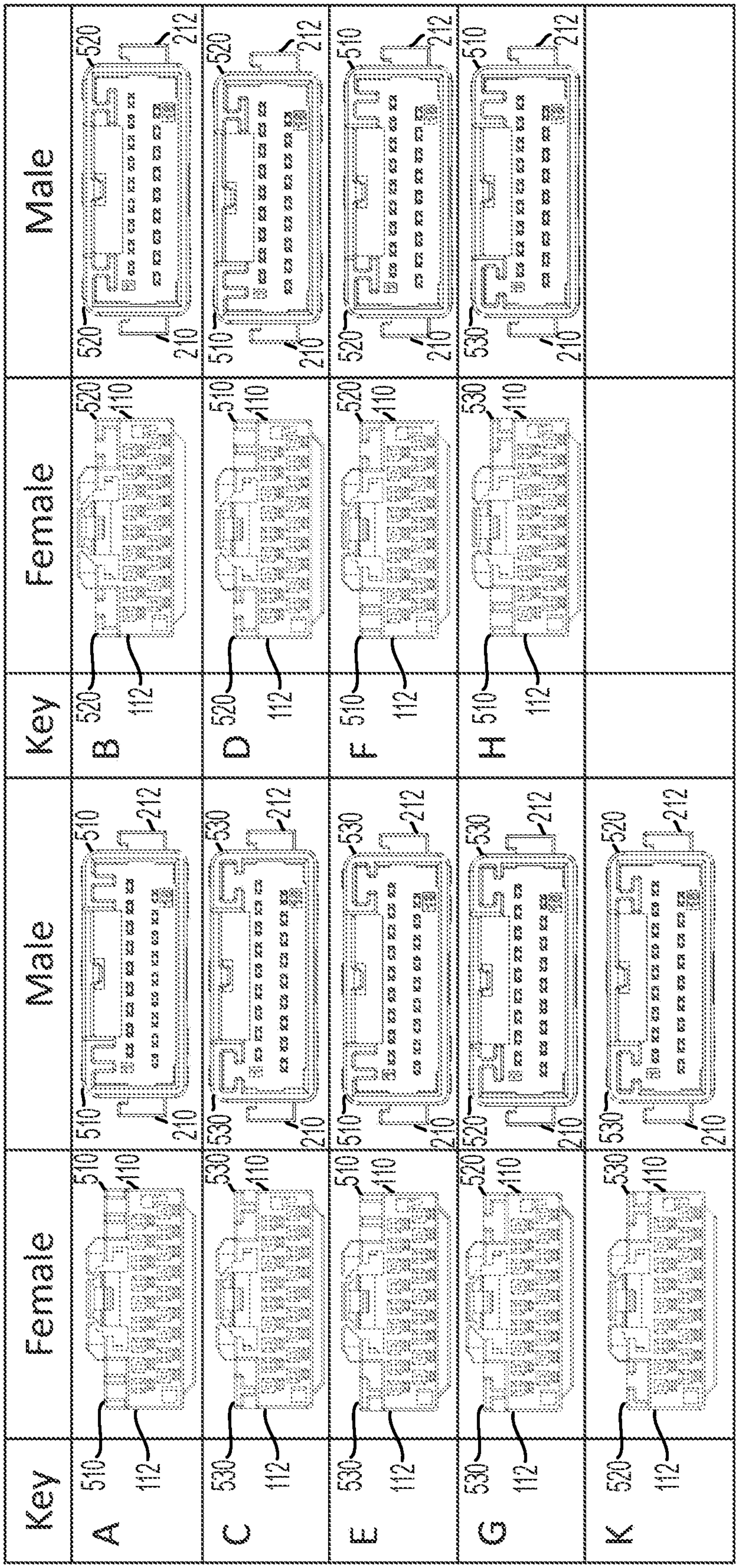
FIG. 7 is a table of keying patterns according to various aspects.

The aspects described in FIGS. 4-6 each has same keying patterns 504 on both sides of male housing 200 and female housing 100. However, in some aspects, male housing 200 and female housing 100 can have different keying patterns 504 on the two sides. As long as keying pattern 504 on first side 210 of male housing 200 match with keying pattern 504 on first side 110 of female housing 100, and keying pattern 504 on second side 212 of male housing 200 match with keying pattern 504 on second side 112 of female housing 100, male housing 200 and female housing 100 can fully mate. Therefore, given the three keying patterns 504—the rod pattern, the inverted-T pattern, and the T pattern as discussed above, nine different keying options (A-K) are possible by combining same or different keying patterns 504 on the two sides of male housing 200 and female housing 100, which are tabulated in FIG. 7.

In key option A, keying patterns 504 include rod pattern 510 on first side 110/210 and rod pattern 510 on second side 110/210. In key option B, keying patterns 504 include inverted-T pattern 520 on first side 110/210 and inverted-T pattern 520 on second side 110/210. In key option C, keying patterns 504 include T pattern 503 on first side 110/210 and T pattern 503 on second side 110/210. In key option D, keying patterns 504 include rod pattern 510 on first side 110/210 and inverted-T pattern 520 on second side 110/210. In key option E, keying patterns 504 include rod pattern 510 on first side 110/210 and T pattern 503 on second side 110/210. In key option F, keying patterns 504 include inverted-T pattern 520 on first side 110/210 and rod pattern 510 on second side 110/210. In key option G, keying patterns 504 include inverted-T pattern 520 on first side 110/210 and T pattern 503 on second side 110/210. In key option H, keying patterns 504 include T pattern 503 on first side 110/210 and rod pattern 510 on second side 110/210. In key option K, keying patterns 504 include T pattern 503 on first side 110/210 and inverted-T pattern 520 on second side 110/210. When male housing 200 and female housing 100 have the same key option can they be fully mated.

In some aspects, when male housing 200 and female housing 100 having mismatch keying patterns 504 are mated together, the interference between mismatch keying patterns 504 can result in an insertion force at least three times greater than the insertion force when keying patterns 504 are matching. In some aspects, the insertion force between mismatch keying patterns 504 is the force enough to cause keying ribs 502 to deform or to break.

In some aspects, the insertion force between mismatch keying patterns 504 is at least approximately 150 N, while the insertion force between matched keying patterns 504 is less than approximately 50 N. In some aspects, when female key option B is mismated with male key option D, the insertion force is approximately 278.55 N. In some aspects, when female key option B is mismated with male key option K, the insertion force is approximately 236.83 N. In some aspects, when female key option C is mismated with male key option E, the insertion force is approximately 250.12 N. In some aspects, when female key option C is mismated with male key option G, the insertion force is approximately 343.92 N. In some aspects, when female key option D is mismated with male key option B, the insertion force is approximately 243.26 N. In some aspects, when female key option D is mismated with male key option K, the insertion force is approximately 276.09 N. In some aspects, when female key option E is mismated with male key option C, the insertion force is approximately 287.13 N. In some aspects, when female key option E is mismated with male key option G, the insertion force is approximately 254.80 N. In some aspects, when female key option F is mismated with male key option H, the insertion force is approximately 166.87 N. In some aspects, when female key option G is mismated with male key option C, the insertion force is approximately 165.29 N. In some aspects, when female key option G is mismated with male key option E, the insertion force is approximately 400.04 N. In some aspects, when female key option His mismated with male key option F, the insertion force is approximately 303.97 N. In some aspects, when female key option K is mismated with male key option D, the insertion force is approximately 255.95 N. In some aspects, when female key option K is mismated with male key option F, the insertion force is approximately 230.16 N.

The present invention(s) have been described above with the aid of functional building blocks illustrating the implementation of specified functions and relationships thereof.

The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A connector, comprising:
- a male housing, comprising:
  - a first keying pattern on a left side of the male housing; and
  - a second keying pattern on a right side of the male housing,
  - wherein the first keying pattern and the second keying pattern each comprises a rib and a groove, and the first keying pattern and the second keying pattern are different; and
- a female housing to mate with the male housing, comprising:
  - a third keying pattern on a left side of the female housing; and
  - a fourth keying pattern on a right side of the female housing,
  - wherein the third keying pattern and the fourth keying pattern each comprises a rib and a groove, and the third keying pattern and the fourth keying pattern are different,
- wherein the rib of the first keying pattern is configured to be inserted to the groove of the third keying pattern, and the rib of the third keying pattern is configured to be inserted to the groove of the first keying pattern, thereby allowing the female housing to mate with the male housing, and
- wherein the rib of the second keying pattern is configured to be inserted to the groove of the fourth keying pattern, and the rib of the fourth keying pattern is configured to be inserted to the groove of the second keying pattern, thereby allowing the female housing to mate with the male housing.

2. The connector of claim 1, wherein the rib of the first pattern has a cross-sectional area in a rod shape, and the groove of the third pattern has a cross-sectional area in a rod shape.

3. The connector of claim 1, wherein the rib of the first pattern has a cross-sectional area in an inverted-T shape extending from the top side of the male housing, and the groove of the third pattern has a cross-sectional area in an inverted-T shape.

4. The connector of claim 1, wherein the groove of the first pattern has a cross-sectional area in a T shape, and the rib of the third pattern has a cross-sectional area in a T shape extending from the top side of the female housing.

5. The connector of claim 1, wherein the rib of the second pattern has a cross-sectional area in a rod shape, and the groove of the fourth pattern has a cross-sectional area in a rod shape.

6. The connector of claim 1, wherein the rib of the second pattern has a cross-sectional area in an inverted-T shape extending from the top side of the male housing, and the groove of the fourth pattern has a cross-sectional area in an inverted-T shape.

7. The connector of claim 1, wherein the groove of the second pattern has a cross-sectional area in a T shape, and the rib of the fourth pattern has a cross-sectional area in a T shape extending from the top side of the female housing.

8. The connector of claim 1, wherein the rib of the first pattern and the rib of the second pattern extend from a front side of the male housing to a point between the front side and a rear side of the male housing.

9. The connector of claim 1, wherein the rib of the third pattern and the rib of the fourth pattern extend from a rear side of the female housing to a point between the rear side and a front side of the female housing.

10. The connector of claim 1, wherein the rib of the male housing extends downwardly from a top side of the male housing.

11. The connector of claim 1, wherein the rib of the female housing extends upwardly from a top side of the female housing.

12. A method of connecting a connector, comprising:
- selecting a first housing comprising a first keying pattern comprising a rib and a groove;
- selecting a second housing comprising a second keying pattern comprising a rib and a groove, the second keying pattern corresponding to the first keying pattern,
- wherein the rib of the first keying pattern is configured to be inserted to the groove of the second keying pattern, and the rib of the second keying pattern is configured to be inserted to the groove of the first keying pattern, and
- wherein the rib of the first keying pattern has a cross-sectional area in an inverted-T shape or the groove of the first keying pattern has a cross-sectional area in a T shape; and
- mating the first housing with the second housing with a first force.

13. The method of claim 12, wherein if a third housing comprising a third keying pattern comprising a rib and a groove different from the second keying pattern is used to mate the third housing with the first housing with a second force, the second force is at least three times larger than the first force.

14. The method of claim 13, wherein the rib of the first keying pattern and the rib of the third keying pattern are deformed if the first housing and the third housing are mated.

15. A connector, comprising:
- a first housing having a first keying system selected from an inverted-T shape formed by a rib or a T shape formed by a groove;
- a second housing having a second keying system selected from an inverted-T shape formed by a groove or a T shape formed by a rib,
- wherein the second keying system is configured to mate with the first keying system such that the second keying system is selected to correspond to the first keying system.

16. The connector of claim 15, wherein the first keying system is disposed on a left side of the first housing, and the second keying system is disposed on a left side of the second housing.

17. The connector of claim 15, wherein the first keying system is disposed on a right side of the first housing, and the second keying system is disposed on a right side of the second housing.

18. The connector of claim 15, wherein the first keying system extends from a top of the first housing, and the second keying system extends from a top of the second housing.

19. The connector of claim 15, wherein the first keying system is disposed on a front of the first housing, and the second keying system is disposed on a rear of the second housing.

20. The connector of claim 15, wherein the first keying system is disposed along a longitudinal direction of the first housing, and the second keying system is disposed along a longitudinal direction of the second housing.

* * * * *